(12) United States Patent
Park et al.

(10) Patent No.: US 9,377,908 B2
(45) Date of Patent: Jun. 28, 2016

(54) HAPTIC ACTUATING TOUCH SCREEN

(71) Applicant: Electronics and Telecommunications Research Institute, Daejeon (KR)

(72) Inventors: Suntak Park, Daejeon (KR); Ki Uk Kyung, Daejeon (KR); Jong-uk Lee, Andong (KR); Young Sung Kim, Daejeon (KR); Sung Ryul Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 281 days.

(21) Appl. No.: 13/827,948

(22) Filed: Mar. 14, 2013

(65) Prior Publication Data
US 2013/0249859 A1    Sep. 26, 2013

(30) Foreign Application Priority Data

Mar. 26, 2012 (KR) .......................... 10-2012-0030482
Jan. 31, 2013 (KR) .......................... 10-2013-0011342

(51) Int. Cl.
  *G06F 3/044* (2006.01)
  *G06F 3/01* (2006.01)
  *G06F 3/045* (2006.01)

(52) U.S. Cl.
  CPC ................. *G06F 3/044* (2013.01); *G06F 3/016* (2013.01); *G06F 3/045* (2013.01)

(58) Field of Classification Search
  CPC ..................................................... G06F 3/041
  USPC .................................................. 345/173–179
  See application file for complete search history.

(56) References Cited

U.S. PATENT DOCUMENTS

| | | | | |
|---|---|---|---|---|
| 5,451,724 A | * | 9/1995 | Nakazawa et al. | 178/18.05 |
| 2009/0322496 A1 | * | 12/2009 | da Costa | 340/407.2 |
| 2012/0268386 A1 | * | 10/2012 | Karamath | G06F 3/041 345/173 |
| 2012/0306790 A1 | * | 12/2012 | Kyung et al. | 345/173 |
| 2013/0134996 A1 | * | 5/2013 | Burberry et al. | 324/679 |

FOREIGN PATENT DOCUMENTS

| | | |
|---|---|---|
| KR | 10-2010-0015259 A | 2/2010 |
| KR | 10-2010-0066268 A | 6/2010 |
| KR | 10-2010-0074819 A | 7/2010 |
| KR | 10-2011-0071521 | 6/2011 |
| KR | 10-2011-0110296 A | 10/2011 |

* cited by examiner

*Primary Examiner* — Alexander Eisen
*Assistant Examiner* — Cory Almeida

(57) ABSTRACT

Provided is a touch screen for generating a haptic sense that may minimize a structure added for haptic generation by simultaneously employing a single electrode layer that constitutes an existing touch panel as an electrode layer for transferring the haptic sense. A touch screen for generating a haptic sense according to an exemplary embodiment of the present disclosure includes a touch panel including at least one substrate, each formed with at least one electrode, and an additional electrode to generate the haptic sense on a portion touched on the touch panel using an electrostatic force that occurs between the additional electrode and a predetermined electrode among the at least one electrode.

12 Claims, 3 Drawing Sheets

HAPTIC ACTUATING TOUCH SCREEN

CROSS-REFERENCE TO RELATED APPLICATIONS

This application is based on and claims priority from Korean Patent Application No. 10-2012-0030482, filed on Mar. 26, 2012, and Korean Patent Application No. 10-2013-0011342, filed on Jan. 31, 2013, with the Korean Intellectual Property Office, the disclosure of which is incorporated herein in its entirety by reference.

TECHNICAL FIELD

The present disclosure relates to a touch screen configuring technology that provides a localized touch feeling or various touch feelings on a place where a hand of a user touches when the user interacts with an object displayed on a touch screen.

BACKGROUND

Various types of digital terminals such as a mobile phone, a navigation, a digital information display (DID), a tablet, and the like, which are currently being released, basically provide a touch interface. A technology that has currently risen as a method of increasing user experience while interacting with the touch interface is a haptic technology of providing a haptic sense. In a case of using the haptic technology, it is possible to provide a more realistic user interface by generating various types of haptic senses and providing the user with a feedback in which a sense of sight and a sense of touch are converged when the user interacts with a digital object.

A motor scheme is most general as a scheme for providing a haptic sense according to the related art. The motor scheme has been variously utilized for a mobile device due to a quick response speed, low power, and easy haptic output control. However, in a case of providing the haptic sense using the motor scheme, it is difficult to arrange modules due to a size of a haptic module and the thickness itself of a mechanism becomes thick. In particular, the related art using the motor scheme is in a structure in which vibration spreads to the overall mechanism and thus, it is difficult to provide a localized haptic sense only to a portion where a user hand touches. Accordingly, there is a difficulty in applying the related art to a navigation, a DID, a monitor, and the like, which are not portable electronic devices.

To overcome the above disadvantages, a film type haptic module technology capable of mounting a film type haptic module on a display panel has recently appeared. The film type haptic module is generally classified into a case of using transformation of a material itself using an electro active polymer material and a case of using an electrostatic force. Here, in the case of using the electro active polymer material, it is possible to configure a haptic module that is a film type, uses low power, and has a quick response speed based on a characteristic of polymer. In this instance, it is difficult to provide sufficient output only with transformation of the polymer material and thus, an additional device (mass) having a predetermined weight may also be used. Consequently, transformation of the electro active polymer activates the additional device and a user is provided with a haptic sense due to the activation of the additional device. Accordingly, in this case, an electro active polymer layer and the additional device are required to provide sufficient output.

The existing scheme using the electrostatic force is a principle of generating a haptic sense by an electrostatic force that occurs between two sheets of substrates, that is, an instantaneous attractive force and repulsive force by matching the same or different charges to each substrate in a state in which two sheets of substrates coated with a conductive material are disposed to face a conductive layer. An actuator device including two sheets of substrates as above is independently configured on or below a touch panel. In an actual application, an insulating layer inserted between substrates is also required to prevent current pass.

In the case of the aforementioned related arts, a plurality of substrates, an electrode layer, an insulating layer, and the like, need to be inserted on or below an existing touch panel in order to simultaneously provide a location recognition and a haptic feedback by a touch. However, in a case of inserting the above structure into a touch screen, there are problems, such as a decrease in product yield, an increase in cost, and degradation in light transmittance. Accordingly, it is very difficult to apply the above structure to an actual product.

SUMMARY

The present disclosure has been made in an effort to provide a touch screen for generating a localized touch feeling or various touch feelings on a place where a hand of a user touches when the user interacts with an object displayed on a touch type display.

In particular, the present disclosure provides a touch screen that may minimize a structure added for haptic generation by simultaneously employing a single electrode layer that constitutes an existing touch panel as an electrode layer for transferring a haptic sense, and thereby prevent a decrease in yield of touch screen production, degradation in light transmittance, and the like.

An exemplary embodiment of the present disclosure provides a touch screen for generating a haptic sense, the touch screen including a touch panel including at least one substrate, each formed with at least one electrode; and an additional electrode to generate the haptic sense on a portion touched on the touch panel using an electrostatic force that occurs between the additional electrode and a predetermined electrode among the at least one electrode.

The additional electrode may be formed on an upper substrate of a display panel, and the touch panel may be formed on the additional electrode.

The touch panel may be a resistive or an electrostatic capacitive touch panel.

Another exemplary embodiment of the present disclosure provides a touch screen for generating a haptic sense using a resistive scheme, the touch screen including a first substrate and a second substrate; a first electrode and a second electrode formed on a bottom surface of the first substrate and a top surface of the second substrate, respectively; a spacer formed between the first electrode and the second electrode to maintain a predetermined interval between the first electrode and the second electrode; a third electrode formed below the second substrate to generate the haptic sense on a portion touched on the first substrate using an electrostatic force that occurs between the second electrode and the third electrode; and an adhesive layer attaching a portion between the second substrate and the third electrode so that the third electrode is positioned to be spaced apart from below the second substrate by a predetermined interval.

In a case in which a touch by an external object occurs, the portion touched on the first substrate may contact with the second substrate and the second substrate may be bent due to the electrostatic force that occurs between the second electrode and the third electrode.

The third electrode may be formed on an upper substrate of a display panel.

Yet another exemplary embodiment of the present disclosure provides a touch screen for generating a haptic sense using an electrostatic capacitive scheme, the touch screen including a first substrate and a second substrate; a first electrode formed between the first substrate and the second substrate; a second electrode formed on a bottom surface of the second substrate; a third electrode formed below the second electrode to generate the haptic sense on a portion touched on the first substrate using an electrostatic force that occurs between the third electrode and the first electrode or the second electrode; an insulating layer formed between the second electrode and the third electrode; and an adhesive layer attaching a portion between the insulating layer and any one of the second electrode and the third electrode, so that the third electrode is positioned to be spaced apart from below the second electrode by a predetermined interval.

The first electrode or the second electrode may be formed as an electrode layer in a form of a predetermined pattern. The insulating layer may be formed in the same form as a dot spacer of a touch panel.

Still another exemplary embodiment of the present disclosure provides a touch screen for generating a haptic sense using an electrostatic capacitive scheme, the touch screen including a first substrate and a first electrode constituting a touch panel in a direct patterned window (DPW) structure; a second electrode formed below the first electrode to generate the haptic sense on a portion touched on the first substrate using an electrostatic force that occurs between the first electrode and the second electrode; an insulating layer formed between the first electrode and the second electrode; and an adhesive layer attaching a portion between the insulating layer and any one of the first electrode and the second electrode, so that the second electrode is positioned to be spaced apart from below the first electrode by a predetermined interval.

The first electrode may be formed as an electrode layer in a form of a predetermined pattern. The insulating layer may be formed in the same form as a dot spacer of a touch panel.

According to the exemplary embodiments of the present disclosure, it is possible to configure a touch screen that provides a localized touch feeling and various touch feelings by vibrating a substrate of a touch panel using an electrostatic force that occurs on a place where a hand of a user contacts.

By simultaneously employing a single electrode layer that constitutes an existing touch panel as an electrode layer for transferring the haptic sense, it is possible to minimize a structure added for haptic generation, thereby preventing a decrease in yield of touch screen production, degradation in light transmittance, and the like.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, and drawings are not meant to be limiting. Other embodiments may be utilized, and other changes may be made, without departing from the scope of the invention.

Figure 1:
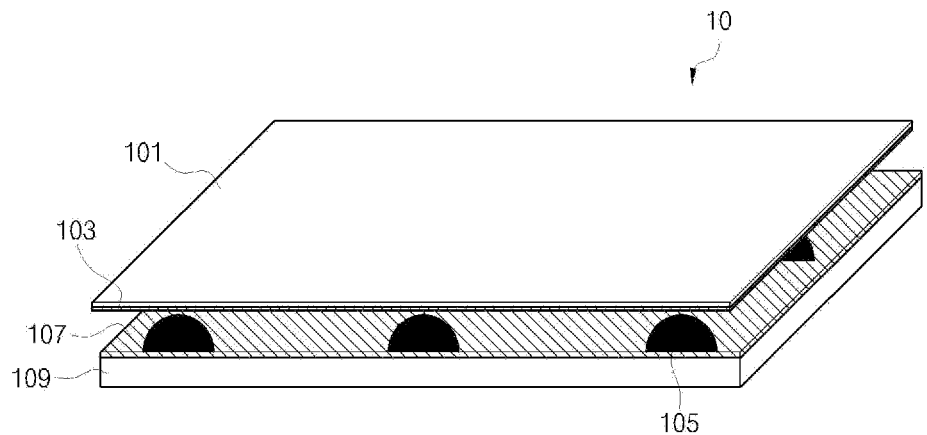
FIG. 1 is a view illustrating a structure of a touch panel using a resistive scheme according to a related art.

FIG. 1 is a view illustrating a structure of a touch panel 10 using a resistive scheme according to a related art.

Referring to FIG. 1, the touch panel 10 according to the related art includes a first substrate 101, a first electrode 103, a spacer 105, a second electrode 107, and a second substrate 109.

The first substrate 101 coated with the first electrode 103 may be formed using a flexible film to make it possible to contact with the second substrate 109 when a user touches the first substrate 101. The second substrate 109 coated with the second electrode 107 may be formed using a glass substrate or film. The first electrode 103 and the second electrode 109 may be formed on the first substrate 101 and the second substrate 109 using a transparent conductive material such as indium tin oxide (ITO), respectively. The spacer 105 is generally formed using a polymer material and enables the first electrode 103 and the second electrode 107 to maintain a predetermined interval therebetween without current pass.

The present disclosures configures a structure of minimizing an additional configuration for haptic generation by simultaneously employing a substrate and an electrode layer used for a touch panel as a substrate and an electrode layer to generate a haptic sense, instead of independently configuring a haptic providing device separate from the existing touch panel of FIG. 1. A principle of generating the haptic sense uses a attractive force and a repulsive force that occur between one of electrode layers of a touch panel and one electrode layer that is added. Here, a vibrating substrate to generate the haptic sense may use one of substrates that constitute the touch panel.

Figure 2A:
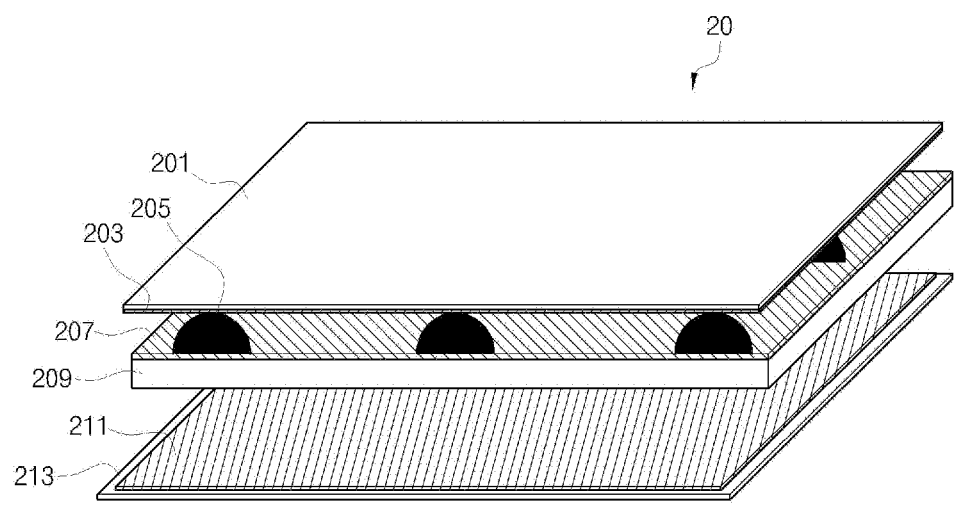
FIGS. 2A and 2B are views illustrating a configuration of a touch screen using a resistive scheme according to an exemplary embodiment of the present disclosure.
Figure 2B:
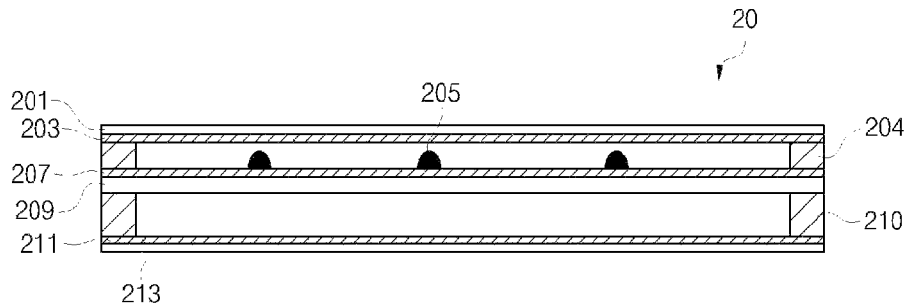

FIGS. 2A and 2B are views illustrating a configuration of a touch screen 20 for generating a haptic sense using a resistive scheme according to an exemplary embodiment of the present disclosure. FIG. 2A is a perspective view and FIG. 2B is a cross-sectional view.

Referring to FIGS. 2A and 2B, the touch screen 20 for generating the haptic sense according to an exemplary embodiment of the present disclosure includes a first substrate 201, a second substrate 209, a first electrode 203 formed on a bottom surface of the first substrate 201, a second electrode 207 formed on a top surface of the second substrate 209, a spacer 205 formed between the first electrode 203 and the second electrode 207 to maintain a predetermined interval between the first electrode 203 and the second electrode 207, an adhesive layer 204 attaching a portion between the first electrode 203 and the second electrode 207, a third electrode 211 formed blow the second substrate 209 to generate the haptic sense on a portion touched on the first substrate 201 using an electrostatic force that occurs between the second electrode 207 and the third electrode 211, a third substrate 213, and a second adhesive layer 210 attaching a portion between the second substrate 209 and the third electrode 211 so that the third electrode 211 may be positioned to be spaced apart from below the second substrate 209 by a predetermined interval. The above structure is a structure in which the third electrode 211 and the third substrate 213 for generating the haptic sense are added to the touch panel structure using the resistive scheme of FIG. 1.

A touch location recognizing method is the same as an existing touch panel driving method, and may generate the haptic sense on a touched object by moving the second substrate 209 coated with the second electrode 207 using the electrostatic force between the second electrode 207 of the touch panel and the third electrode 211 added for the haptic sense, when transferring the haptic sense. Here, it is advantageous to form the second substrate 209 to be as thin as possible to be bendable by the electrostatic force. The second substrate 209 may be formed using plastic, glass, a polymer substrate, and the like. The third substrate 213 may be thicker or harder than the second substrate 209 and thus, be configured not to be bent when the electrostatic force occurs, so that a maximum force may work on the second substrate 209.

The adhesive layer 204 and the second adhesive layer 210 (or a double-sided tape) may be formed between the first electrode 203 and the second electrode 207, and between the second substrate 209 and the third electrode 211, respectively. Here, the second substrate 209 and the third electrode 211 may be positioned to be spaced apart from each other by a predetermined interval using the second adhesive layer 210. Through the above space, the second substrate 209 may vibrate. The above space may be filled with the air, and may also be filled with electro active polymer and other materials having small resistance.

Figure 3A:
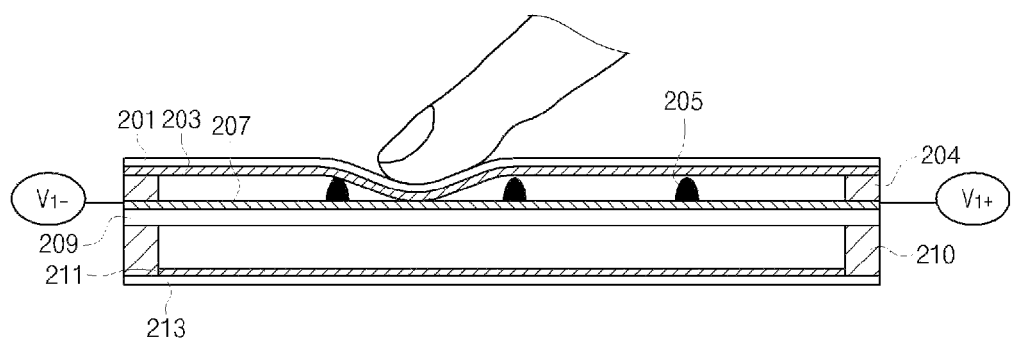
FIGS. 3A and 3B are views to describe a principle of generating a haptic sense when an external object contacts with a touch screen according to the exemplary embodiment of FIGS. 2A and 2B.
Figure 3B:
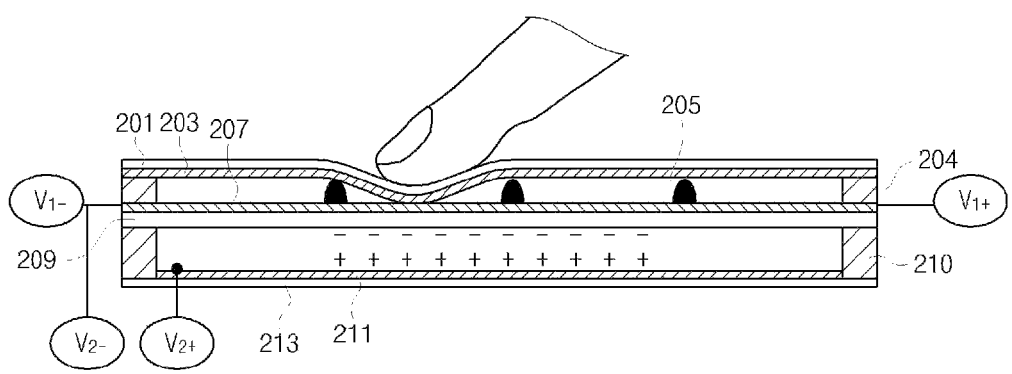

FIGS. 3A and 3B are views to describe a principle of generating a haptic sense when an external object contacts with a touch screen according to the exemplary embodiment of FIGS. 2A and 2B.

As illustrated in FIG. 3A, a touch location recognizing method is the same as an operation method of an existing touch panel using a resistive scheme. When a potential difference is applied to a single electrode layer in an x-axial direction and contacts with another electrode layer, a location of an x axis is recognized by measuring a change in resistance or the potential difference. Similarly thereto, a location of a y axis is recognized. The above touch location recognizing method is widely known in the art and thus, a further detailed description will be omitted here.

As illustrated in FIG. 3B, a method of generating a haptic sense uses a attractive force and a repulsive force by applying the same type of charge or different charges to the second electrode 207 that is one of electrodes used for touch position recognition and the third electrode 211. That is, $V_{1-}$, $V_{1+}$, and $V_{2-}$ have the same potential and the same type of charge is applied. The charge is applied so that $V_{2+}$ and $V_{2-}$ may have the same or different potential.

Alternatively, a method using only the attractive force is a method of generating the attractive force by repeating a process of fixing one of $V_{2+}$ and $V_{2-}$ to 0V or predetermined potential and applying charge to another one of $V_{2+}$ and $V_{2-}$. Due to an electric field formed between two electrodes, that is, the second electrode 207 and the third electrode 211 through the above methods, the repulsive force or the attractive force occurs, thereby moving the second substrate 207. When the attractive force and the repulsive force or the attractive force repeatedly occurs as above, the second substrate 207 vibrates. The vibration is transferred to the object (finger) touched on the first substrate 201 as the haptic sense. Here, the finger is in a state of touching on the second substrate 207 by a pushing force. Accordingly, it is possible to transfer a localized haptic sense only to a touched location, that is, the finger touching on the second substrate 207.

The above touch function and haptic generating function may be sequentially performed, and may also be simultaneously performed. To process the actual touch function and haptic generating function at a fast rate, even though the haptic sense is generated, $V_{1-}$ and $V_{1+}$ may have different potentials and have a potential difference of a few V to tens of V. Even though $V_{1-}$ and $V_{1+}$ have the potential difference, the potential difference (the potential difference between $V_{2-}$ and $V_{2+}$) to generate the haptic sense has the potential difference of hundreds of or thousands of V. Accordingly, a potential difference effect of $V_{1-}$ and $V_{1+}$ to perform the touch function is insignificant.

Figure 4:
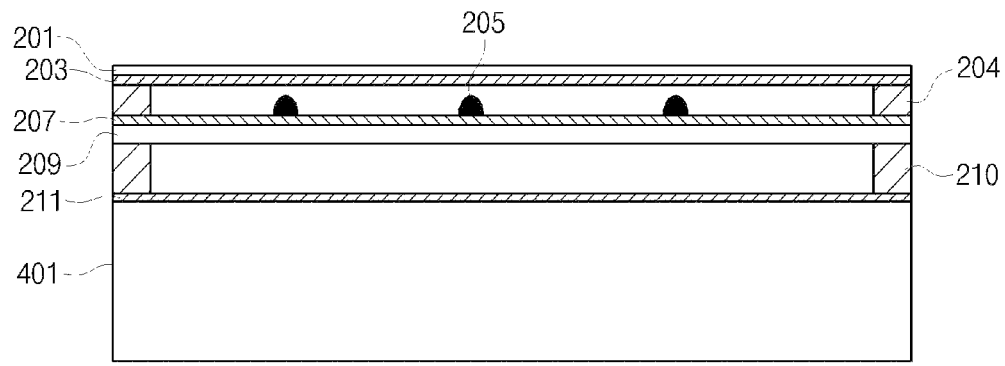
FIG. 4 is a view illustrating a configuration of a touch screen using a resistive scheme according to another exemplary embodiment of the present disclosure.

FIG. 4 is a view illustrating a configuration of a touch screen using a resistive scheme according to another exemplary embodiment of the present disclosure, and illustrates a case in which the third substrate 213 of FIGS. 2A and 2B is configured as an upper substrate 401 of a display panel.

In a display device having an actual touch recognizing function, a touch panel may be formed on the display panel and be used as the touch screen. Here, as illustrated in FIG. 4, in a case of using the upper substrate 401 of the display panel as an additional substrate of the touch panel for providing the haptic sense, a structure that is added to an existing touch screen structure in order to generate the haptic sense is only the third electrode 211. When using the above structure, it is possible to use an existing touch panel production line as is and thus, it is possible to produce a haptic providing touch panel without decreasing yield of product production. It may be very advantageously applied to production of an actual product.

Figure 5:
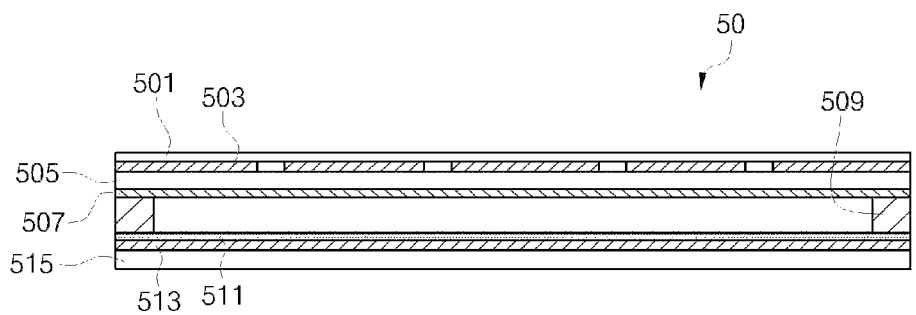
FIG. 5 is a view illustrating a configuration of a touch screen for generating a haptic sense using an electrostatic capacitive scheme according to another exemplary embodiment of the present disclosure.

FIG. 5 is a view illustrating a configuration of a touch screen 50 for generating a haptic sense using an electrostatic capacitive scheme according to another exemplary embodiment of the present disclosure.

Referring to FIG. 5, the touch screen 50 for generating the haptic sense according to another exemplary embodiment includes a first substrate 501, a second substrate 505, a first electrode 503 formed between the first substrate 501 and the second substrate 505, a second electrode 507 formed on a bottom surface of the second substrate 505, a third electrode 513 formed below the second electrode 507 to generate the haptic sense on a portion touched on the first substrate 501 using an electrostatic force that occurs between the first electrode 503 or the second electrode 507 and the third electrode 513, an insulating layer 511 formed between the second electrode 507 and the third electrode 513, and an adhesive layer 509 attaching a portion between the second electrode 507 and the insulating layer 511, so that the third electrode 513 may be positioned to be spaced part from below the second electrode 507 by a predetermined interval.

Here, the first electrode 503 and the second electrode 507 may be formed as an electrode layer in a pattern form in order to effectively measure a change in capacitance when an external object contacts.

A driving principle of generating the haptic sense is similar to a touch panel using a resistive scheme. When the external object closely approaches or contacts with the first substrate 501, a touch location is initially recognized on the touch panel using an electrostatic capacitive scheme, an electrostatic force occurs using one of the first electrode 503 and the second electrode 507, and the third electrode 513, and the haptic sense is transferred by moving the first substrate 501 or the second substrate 505 using the repulsive force and the attractive force occurring between two electrodes (between the first electrode 503 or the second electrode 507 and the third electrode 513).

Meanwhile, in the exemplary embodiment of FIG. 5, a touch panel portion (the first substrate 501, the first electrode 503, the second substrate 505, and the second electrode 507) is used as a single moving substrate. Here, in order to further effectively transfer the haptic sense, there is a need to manufacture a thickness of the first substrate 501 and the second substrate 505 to be as thin as possible. The first electrode 503 may be inserted between two substrates, that is, the first substrate 501 and the second substrate 505. An adhesive layer may be additionally inserted above or below the first electrode 503. In the structure of FIG. 5, the second electrode 507 and the third electrode 513 face each other. Accordingly, in a case of using the second electrode 507 in order to generate the haptic sense, the insulating layer 511 is required between the second electrode 507 and the third electrode 513. As illustrated in FIG. 5, the insulating layer 511 may be formed on a top surface of the third electrode 513 or may also be formed on a bottom surface of the second electrode 507.

Figure 6:
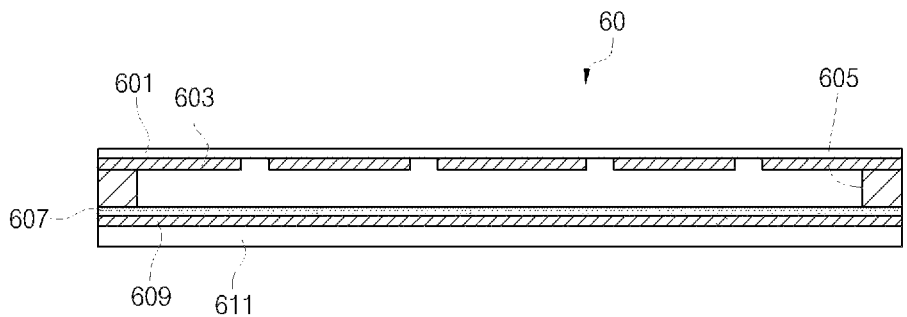
FIG. 6 is a view illustrating a configuration of a touch screen of generating a haptic sense using an electrostatic capacitive scheme according to still another exemplary embodiment of the present disclosure.

FIG. 6 is a view illustrating a configuration of a touch screen 60 of generating a haptic sense using an electrostatic capacitive scheme according to still another exemplary embodiment of the present disclosure.

Referring to FIG. 6, the touch screen 60 for generating the haptic sense according to still another exemplary embodiment of the present disclosure includes a first substrate 601 and a first electrode 603 that constitute a touch panel in a direct patterned window (DPW) structure, a second electrode 609 formed below the first electrode 603 to generate the haptic sense on a portion touched on the first substrate 601 using an electrostatic force that occurs between the first electrode 603 and the second electrode 609, an insulating layer 607 formed between the first electrode 603 and the second electrode 609, and an adhesive layer 605 attaching a portion between the first electrode 603 and the insulating layer 607 so that the second electrode 609 may be positioned to be spaced apart from below the first electrode 603 by a predetermined interval.

In the present exemplary embodiment, the touch panel has the DPW structure. The DPW structure is simpler than a structure of a general touch panel using the electrostatic capacitive scheme of FIG. 5. Accordingly, it is possible to constitute the touch panel using only the first substrate 601 and the first electrode 603. In addition thereto, by forming the adhesive layer 605, the insulating layer 607, the second electrode 609, and a second substrate 611, it is possible to generate a localized haptic sense on the touch panel.

In a case of applying the structure according to the exemplary embodiments of FIGS. 5 and 6, when using an upper substrate of a display panel as an additional substrate (515 or 611), it is possible to configure a touch screen for providing a haptic sense using a very simple structure. The insulating layer 511 or 607 may also be configured as the same form as the dot processor 105 of FIG. 1 as well as a layer structure of covering the entire substrate. Through this, it is possible to further improve light transmittance. Here, in this case, there is a need to prevent current pass between two electrodes based on an insulating layer by making a dot interval dense.

From the foregoing, it will be appreciated that various embodiments of the present disclosure have been described herein for purposes of illustration, and that various modifications may be made without departing from the scope of the present invention. Accordingly, the various embodiments disclosed herein are not intended to be limiting, with the true scope of the invention being indicated by the following claims.

What is claimed is:

1. A touch screen for generating a haptic sense, the touch screen comprising:
   a first substrate;
   a second substrate;
   a first electrode disposed on a bottom surface of the first substrate;
   a second electrode disposed on a top surface of the second substrate; and
   a third electrode disposed below the second substrate,
   wherein, when the portion of the first substrate is touched and the first electrode contacts the second electrode, the second substrate is bent by an electrostatic force originating between the second electrode and the third electrode.

2. The touch screen of claim 1, wherein the third electrode is disposed on an upper substrate of a display panel, and the second substrate is disposed on the third electrode.

3. The touch screen of claim 1, wherein the second substrate is included in a resistive or an electrostatic capacitive touch panel.

4. A touch screen for generating a haptic sense, the touch screen comprising:
   a first substrate and a second substrate;
   a first electrode and a second electrode disposed on a bottom surface of the first substrate and a top surface of the second substrate, respectively;
   a spacer disposed between the first electrode and the second electrode to maintain a predetermined interval between the first electrode and the second electrode;
   a third electrode disposed below the second substrate, the third electrode configured to generate the haptic sense on a touched portion of the first substrate by exerting an electrostatic force on the second electrode; and
   an adhesive layer attaching the second substrate to the third electrode so that the third electrode is positioned below and spaced apart from the second substrate by a predetermined interval,
   wherein, when the portion of the first substrate is touched and the first electrode contacts the second electrode, the second substrate is bent by electrostatic force originating between the second electrode and the third electrode.

5. The touch screen of claim 4, wherein a space in which the second substrate is capable of vibrating is formed by the adhesive layer.

6. The touch screen of claim 4, wherein the first substrate is comprised of a flexible film, the second substrate is using plastic, glass, or polymer, and the first electrode and the second electrode are comprised of a transparent conductive material.

7. The touch screen of claim 4, wherein the third electrode is disposed on an upper substrate of a display panel.

8. A touch screen for generating a haptic sense, the touch screen comprising:
   a first substrate and a second substrate;
   a first electrode disposed between the first substrate and the second substrate;
   a second electrode disposed on a bottom surface of the second substrate;

a third electrode disposed below the second electrode, the third electrode configured to generate the haptic sense on a touched portion of the first substrate by exerting an electrostatic force on the first electrode or the second electrode;

an insulating layer disposed between the second electrode and the third electrode; and an adhesive layer attaching a portion between the insulating layer and any one of the second electrode and the third electrode, so that the third electrode is below and spaced apart from the second electrode by a predetermined interval, wherein, when the portion of the first substrate is touched and the first electrode contacts the second electrode, the second substrate is bent by the electrostatic force originating between the second electrode and the third electrode.

9. The touch screen of claim 8, wherein the insulating layer is disposed on a top surface of the third electrode, and the adhesive layer is disposed between the second electrode and the insulating layer.

10. The touch screen of claim 8, wherein the first electrode or the second electrode is disposed in a predetermined pattern.

11. The touch screen of claim 8, wherein the insulating layer is disposed as a dot spacer of a touch panel.

12. The touch screen of claim 8, wherein the third electrode is disposed on an upper substrate of a display panel.

* * * * *